(12) United States Patent
Fairchild et al.

(10) Patent No.: US 11,364,606 B2
(45) Date of Patent: Jun. 21, 2022

(54) RADIAL BAND WEDGE IMPACT DRIVING DEVICE

(71) Applicant: Apex Brands, Inc., Apex, NC (US)

(72) Inventors: Adam D. Fairchild, Lexington, SC (US); Kyle M. Neubauer, Lexington, SC (US)

(73) Assignee: APEX BRANDS, INC, Apex, NC (US)

( * ) Notice: Subject to any disclaimer, the term of this patent is extended or adjusted under 35 U.S.C. 154(b) by 0 days.

(21) Appl. No.: 17/368,489

(22) Filed: Jul. 6, 2021

(65) Prior Publication Data

US 2021/0331302 A1     Oct. 28, 2021

Related U.S. Application Data

(63) Continuation of application No. PCT/US2020/061946, filed on Nov. 24, 2020.
(Continued)

(51) Int. Cl.
    *B25B 23/14*      (2006.01)
    *B25B 21/02*      (2006.01)
    (Continued)

(52) U.S. Cl.
    CPC .......... *B25B 23/1405* (2013.01); *B25B 21/02* (2013.01); *B25B 23/0035* (2013.01);
    (Continued)

(58) Field of Classification Search
    CPC ....... B23B 31/00; B23B 31/08; B23B 31/008; B23B 31/06; B23B 51/12; B23B 31/003;
    (Continued)

(56) References Cited

U.S. PATENT DOCUMENTS

| | | | |
|---|---|---|---|
| 1,369,491 A | 2/1921 | Straehle | |
| 2,671,484 A * | 3/1954 | Clark | ...................... B25B 23/12 81/451 |

(Continued)

FOREIGN PATENT DOCUMENTS

| | | |
|---|---|---|
| CN | 1597263 A | 3/2005 |
| CN | 1898065 A | 1/2007 |

(Continued)

OTHER PUBLICATIONS

International Search Report and Written Opinion from related international application No. PCT/CN2020/061946 dated Jun. 24, 2020, all pages enclosed cited in its entirety.
(Continued)

*Primary Examiner* — Scott A Smith
(74) *Attorney, Agent, or Firm* — Burr & Forman LLP

(57) ABSTRACT

A torque transfer assembly for a bit holder includes an axial movement limiting subassembly and a rotation limiting subassembly. The axial movement limiting subassembly is configured to retain a drive body of the bit holder in proximity to a driven body of the bit holder. The rotation limiting subassembly is configured to cause torque applied to the drive body to be transferred to the driven body. The rotation limiting subassembly includes a first cam body at a distal end of the drive body and a second cam body at a distal end of the driven body. The first and second cam bodies are configured to transfer a majority of the torque between the drive body and the driven body indirectly via the torque transfer assembly by limiting rotation of the first cam body relative to the second cam body.

18 Claims, 10 Drawing Sheets

Related U.S. Application Data

(60) Provisional application No. 62/991,139, filed on Mar. 18, 2020.

(51) Int. Cl.
*B25B 23/00* (2006.01)
*B25B 21/00* (2006.01)
*B23B 45/00* (2006.01)
*F16D 3/74* (2006.01)

(52) U.S. Cl.
CPC ............ *B25B 23/14* (2013.01); *B23B 45/005* (2013.01); *B25B 21/007* (2013.01); *B25B 23/00* (2013.01); *F16D 3/74* (2013.01)

(58) Field of Classification Search
CPC ... B23B 45/005; B25B 23/0035; B25B 23/12; B25B 23/14; B25B 23/141; B25B 23/1427; B25B 15/001; B25B 21/00; B25B 21/02; B25B 21/007; B25B 23/00; B25B 23/1405; B25B 13/06; F16D 3/04; F16D 3/12; F16D 3/32; F16D 3/72; F16D 3/74; F16D 3/50; F16D 3/54; F16D 3/185
USPC ...... 173/178, 29, 217, 131, 211; 279/79, 80, 279/128, 145, 143, 144, 75, 904, 905; 81/436, 439, 474, 476, 477, 121.1, 438, 81/451, 177.1, 177.2, 177.85; 464/88, 89, 464/31, 37, 30, 147, 154, 182; D8/70, D8/86; 403/220

See application file for complete search history.

(56) References Cited

U.S. PATENT DOCUMENTS

| | | | | |
|---|---|---|---|---|
| 3,630,108 A * | 12/1971 | Stillwagon, Jr. | ........ | B25B 23/12 81/125 |
| 3,744,350 A | 7/1973 | Raff | | |
| 3,779,038 A | 12/1973 | Stuemky | | |
| 3,874,194 A * | 4/1975 | Filepp | ...................... | F16D 3/185 464/154 |
| 4,346,630 A | 8/1982 | Hanson | | |
| 4,669,339 A | 6/1987 | Cartwright | | |
| 5,180,042 A * | 1/1993 | Ogiso | ...................... | F16D 7/027 192/56.1 |
| 5,839,518 A | 11/1998 | Setsuko | | |
| 5,868,047 A | 2/1999 | Faust et al. | | |
| D410,372 S | 6/1999 | Strauch | | |
| 6,105,473 A * | 8/2000 | Huang | .................... | B25B 15/00 81/177.75 |
| 6,330,846 B1 | 12/2001 | Strauch | | |
| 6,345,560 B1 * | 2/2002 | Strauch | ................. | B25B 15/001 81/477 |
| 6,640,911 B2 | 11/2003 | Lieser et al. | | |
| 6,684,740 B2 * | 2/2004 | Lin | ..................... | B25B 23/0021 81/177.2 |
| 7,096,768 B1 * | 8/2006 | Chen | .................... | B25B 15/001 81/125 |
| 7,261,023 B2 * | 8/2007 | Taguchi | ................ | B25B 15/001 81/438 |
| 7,469,909 B2 * | 12/2008 | Strauch | ............... | B25B 23/0035 279/75 |
| 7,597,031 B2 * | 10/2009 | Chiang | ............... | B25B 23/0028 81/177.1 |
| D623,036 S | 9/2010 | DeBaker | | |
| 7,810,817 B1 * | 10/2010 | Gao | ................... | B23B 31/1071 279/75 |
| 8,117,950 B2 * | 2/2012 | Kozak | ................... | B23B 45/005 81/177.6 |
| 8,172,236 B2 * | 5/2012 | Shibata | ................... | B25B 23/12 279/143 |
| 8,226,337 B2 | 7/2012 | Komine et al. | | |
| 8,695,461 B2 * | 4/2014 | Moss | ...................... | B25B 13/06 81/125 |
| D711,719 S | 8/2014 | DeBaker | | |
| 8,876,120 B2 * | 11/2014 | Chen | ..................... | B23B 31/003 279/30 |
| 8,955,418 B2 | 2/2015 | Peters et al. | | |
| 9,095,961 B1 * | 8/2015 | Lenfest | ................. | B25G 1/043 |
| 9,107,721 B2 | 8/2015 | Plotkin | | |
| D752,408 S | 3/2016 | Moss et al. | | |
| 9,283,661 B2 | 3/2016 | Cummings et al. | | |
| 9,469,017 B2 | 10/2016 | Seith et al. | | |
| 9,649,696 B2 | 5/2017 | Teusch | | |
| D789,761 S | 6/2017 | Moss et al. | | |
| 9,695,882 B2 | 7/2017 | Jakoubek | | |
| 9,764,452 B2 * | 9/2017 | Koch | ...................... | B25B 23/12 |
| 9,943,946 B2 * | 4/2018 | Peters | ................. | B23B 31/1071 |
| 10,022,845 B2 | 7/2018 | Neitzell | | |
| 10,166,657 B2 | 1/2019 | Cummings et al. | | |
| 10,245,646 B2 * | 4/2019 | Hu | ......................... | B23B 31/003 |
| 10,376,964 B2 | 8/2019 | Fronius et al. | | |
| 10,513,017 B2 * | 12/2019 | Lourenco | ............ | B25B 23/0035 |
| 10,568,391 B2 | 2/2020 | Glancy et al. | | |
| 10,991,489 B2 | 4/2021 | Schneider et al. | | |
| 11,059,151 B2 | 7/2021 | Cummings et al. | | |
| 2006/0009297 A1 | 1/2006 | Hubiak et al. | | |
| 2006/0230887 A1 * | 10/2006 | Taguchi | .................. | B25B 23/12 81/451 |
| 2007/0099712 A1 | 5/2007 | Smihal | | |
| 2007/0234856 A1 * | 10/2007 | Liu | ........................ | B25B 15/001 81/438 |
| 2009/0311061 A1 | 12/2009 | Santamarina et al. | | |
| 2010/0064860 A1 * | 3/2010 | Kozak | ................. | B25B 23/0028 81/177.6 |
| 2011/0036212 A1 | 2/2011 | Santamarina et al. | | |
| 2011/0170964 A1 | 7/2011 | Rabate et al. | | |
| 2016/0038210 A1 | 2/2016 | Plotkin | | |
| 2016/0325411 A1 | 11/2016 | Wang | | |
| 2019/0232470 A1 | 8/2019 | Xu | | |
| 2019/0293041 A1 | 9/2019 | Dong et al. | | |
| 2020/0215675 A1 | 7/2020 | Hawkins | | |
| 2021/0331302 A1 | 10/2021 | Fairchild et al. | | |

FOREIGN PATENT DOCUMENTS

| | | |
|---|---|---|
| CN | 102470516 A | 5/2012 |
| CN | 102744700 A | 10/2012 |
| CN | 104786184 A | 7/2015 |
| CN | 208147717 U | 11/2018 |
| EP | 2098336 A3 | 10/2011 |
| WO | 2012049078 A1 | 4/2012 |
| WO | 2018204468 A1 | 11/2018 |
| WO | 2020005805 A1 | 1/2020 |

OTHER PUBLICATIONS

International Search Report and Written Opinion from related international application No. PCT/US2019/109788 dated Feb. 19, 2021, all pages enclosed cited in its entirety.

International Search Report and Written Opinion from International Application No. PCT/US2021/049371 dated Dec. 21, 2021, all pages cited in its entirety.

International Search Report and Written Opinion from related International Application No. PCT/US2021/049374 dated Sep. 24, 2021, all pages cited in its entirety.

* cited by examiner

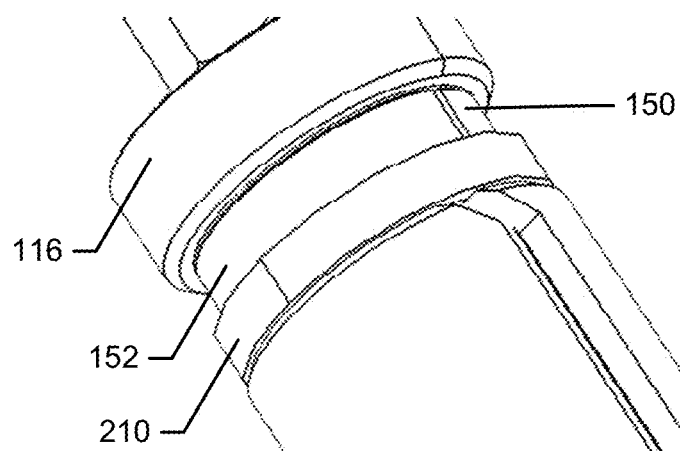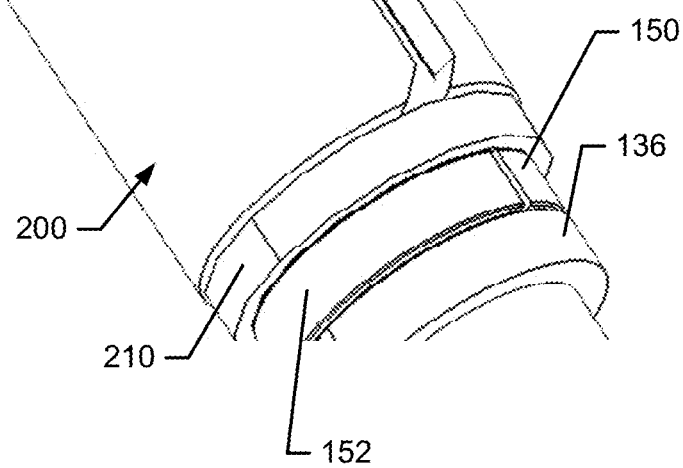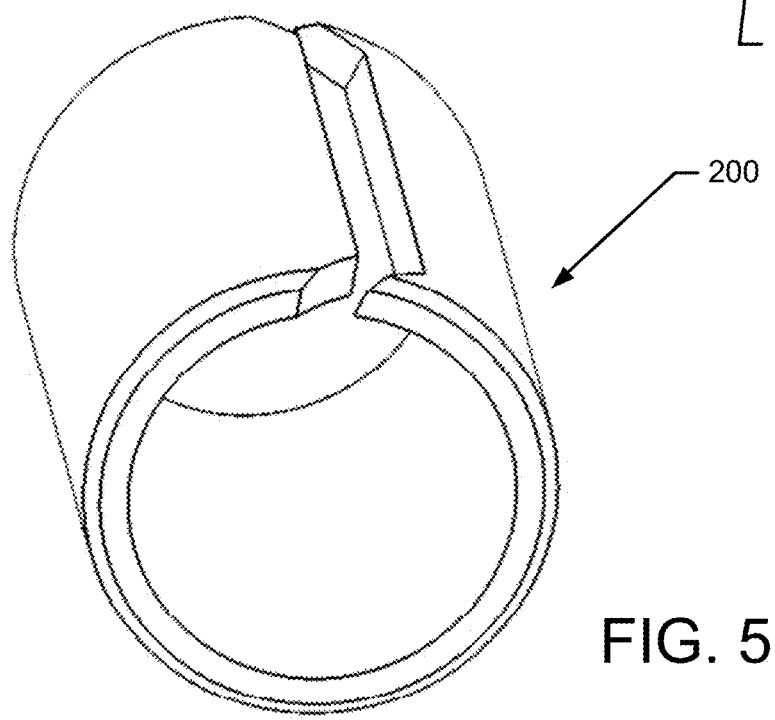

US 11,364,606 B2

RADIAL BAND WEDGE IMPACT DRIVING DEVICE

CROSS-REFERENCE TO RELATED APPLICATIONS

This application is a bypass continuation of international application PCT/US2020/061946, filed on Nov. 24, 2020 which claims priority under 35 U.S.C. § 119(e) to U.S. Provisional Application No. 62/991,139, filed Mar. 18, 2020, which is expressly incorporated by reference herein in its entirety.

TECHNICAL FIELD

Example embodiments generally relate to driving devices such as socket tools, bit holders and other fastener driving components. In particular, example embodiments relate to impact drivers, and provide a form of overload protection for impact drivers.

BACKGROUND

Driving devices, such as socket tools and bit holders, are familiar tools for fastening nuts and driving other drivable components or fasteners. Bit holders, for example, often have a drive end that includes a conventional interface for receiving drive energy from a powered driving device. The drive end may have a standard sized hex head or another conventional power bit drive end geometry. The bit holder may also include a driven end, which is driven by the rotational force applied by the powered driving device at the drive end, and which in turn applies drive energy to a bit. The bit may be received in a hex shaped socket, or any other bit holding geometry that defines a receptacle for the bit.

Bits of various sizes and shapes may have standard (e.g., hex) heads that enable any of the various different bits to interchangeably be inserted into the bit holder. Thus, by attaching the bit holder to the powered driving device (e.g., via a chuck of the powered driving device), any number of different bits can quickly and easily be substituted to meet each situation that is encountered. Because high torque is often applied through these tools, and high strength and durability is desirable, the bit holders are traditionally made of a metallic material such as iron or steel.

Impact drivers are typically employed to apply high and sudden torque to fasteners. The high and sudden torque application made possible by these devices may be particularly useful for loosening of frozen or over-torqued fasteners. However, the application of high and sudden torque may also be useful for applying a high torque to a fastening device that is being used in a context that requires a high input torque. In either case, if a bit holder is used with an impact driver, and the bit holder is rigidly made of metallic materials, the suddenness of the application of force by the powered driving device is equally suddenly applied through the bit holder and to the bit, which could damage the bit, the fastener, or even the bit holder. Thus, it may be desirable to improve bit holder design to lengthen the useful life of driver bits and bit holders.

BRIEF SUMMARY OF SOME EXAMPLES

Some example embodiments may enable the provision of a bit driver that includes a driven end and drive end that are operably coupled to each other via a torque transfer mechanism that, although still applying full impact energy, ensures that loads through the bit holder (and the bit) are not absorbed or dissipated entirely. Thus, high hardness driver bit life can be considerably lengthened.

In an example embodiment, a torque transfer assembly for a bit holder is provided. The torque transfer assembly may include an axial movement limiting subassembly and a rotation limiting subassembly. The axial movement limiting subassembly is configured to retain a drive body of the bit holder in proximity to a driven body of the bit holder. The rotation limiting subassembly is configured to cause torque applied to the drive body to be transferred to the driven body. The rotation limiting subassembly includes a first cam body at a distal end of the drive body and a second cam body at a distal end of the driven body. The first and second cam bodies are configured to transfer a majority of the torque between the drive body and the driven body indirectly via the torque transfer assembly by limiting rotation of the first cam body relative to the second cam body.

In another example embodiment, an impact bit holder may be provided. The impact bit holder may include a drive body having a drive end configured to interface with a powered driver, a driven body having a driven end configured to interface with a bit, and a torque transfer assembly. The drive body may include a first cam body at a distal end thereof relative to drive end, and the driven body may include a second cam body at a distal end thereof relative to the driven end. The torque transfer assembly may be disposed proximate to the first and second cam bodies and may be configured to transfer torque between the drive body and the driven body. The first and second cam bodies and the torque transfer assembly may be configured to transfer a majority of the torque between the drive body and the driven body indirectly via the torque transfer assembly.

BRIEF DESCRIPTION OF THE SEVERAL VIEWS OF THE DRAWING(S)

Having thus described some example embodiments in general terms, reference will now be made to the accompanying drawings, which are not necessarily drawn to scale, and wherein:

FIG. 5 is a perspective view of a split dowel forming an elastic member according to an example embodiment;

FIG. 6 is a perspective view of the split dowel and limiter bands retaining the first radial member and the second radial member according to an example embodiment;

Figure 4B:
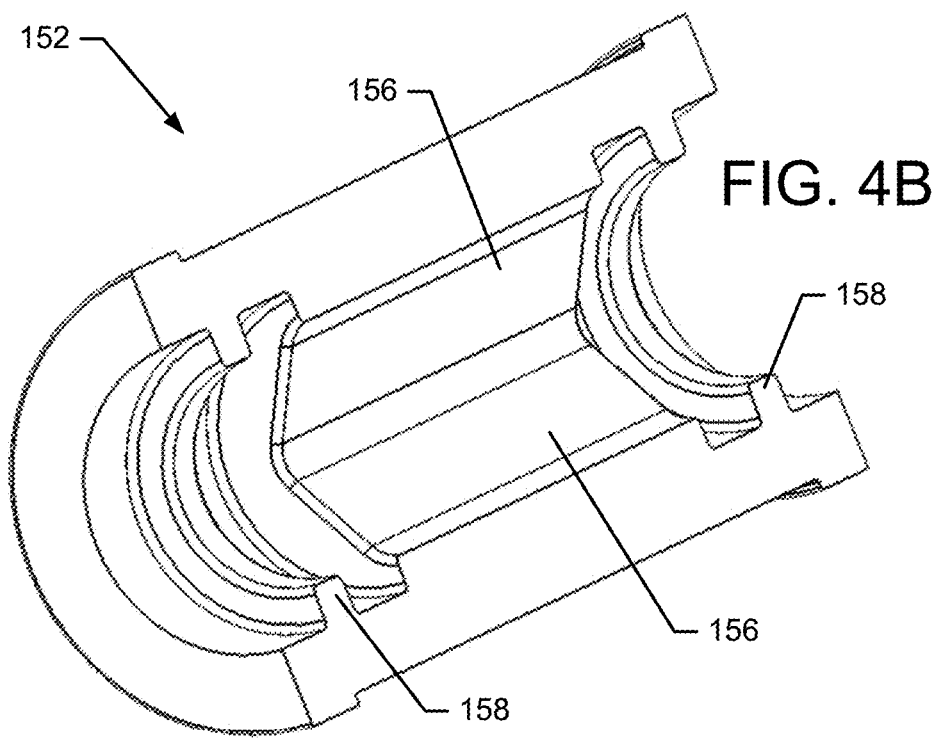
FIG. 4B is a perspective view of a second radial member according to an example embodiment.
Figure 4A:
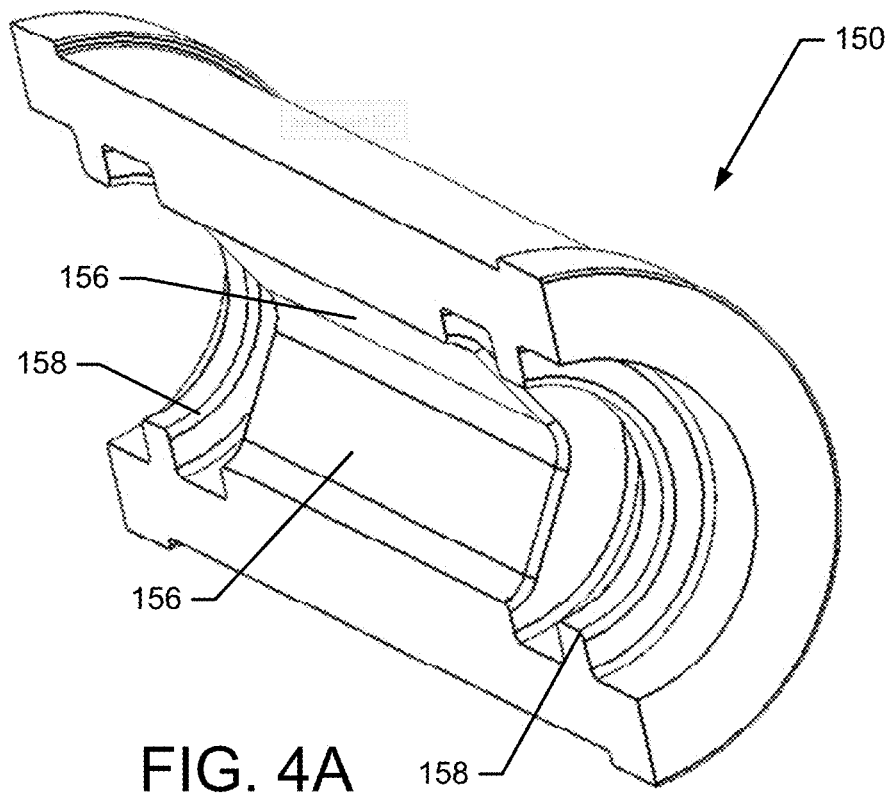
FIG. 4A is a perspective view of a first radial member according to an example embodiment.
Figure 4C:
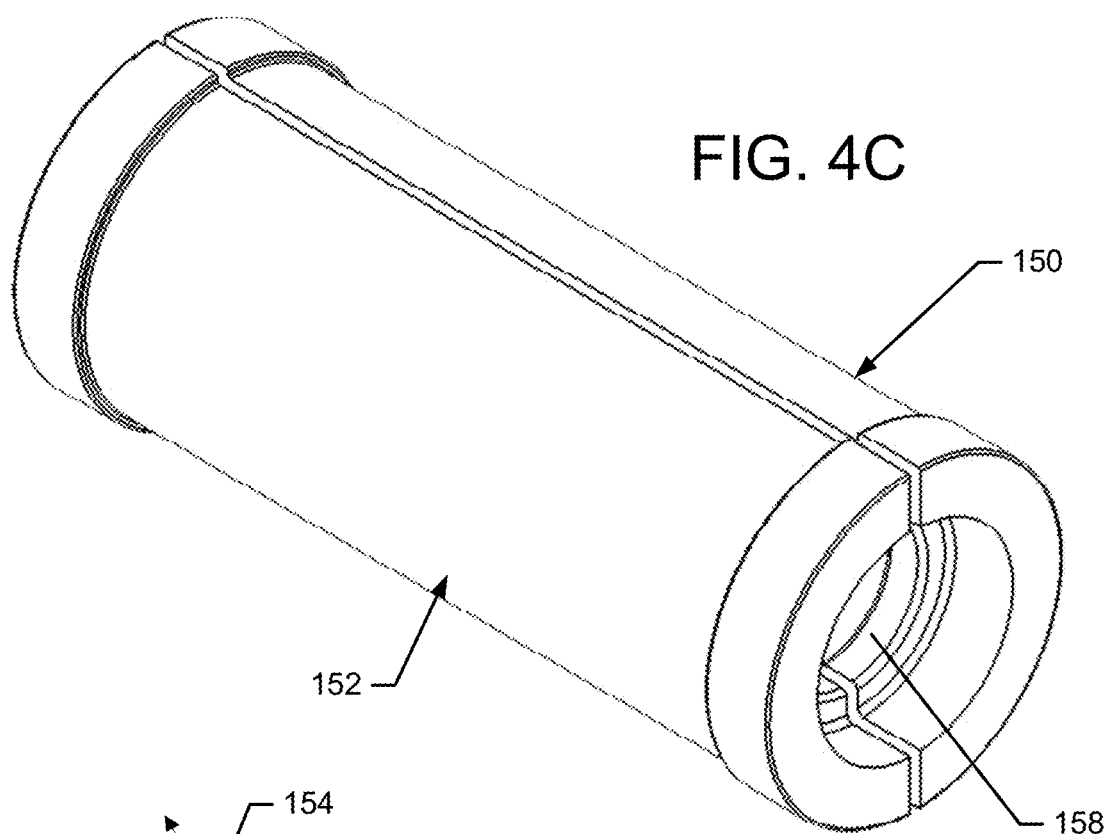
FIG. 4C is a perspective view of the first and second radial members positioned proximate to each other according to an example embodiment.
Figure 4D:
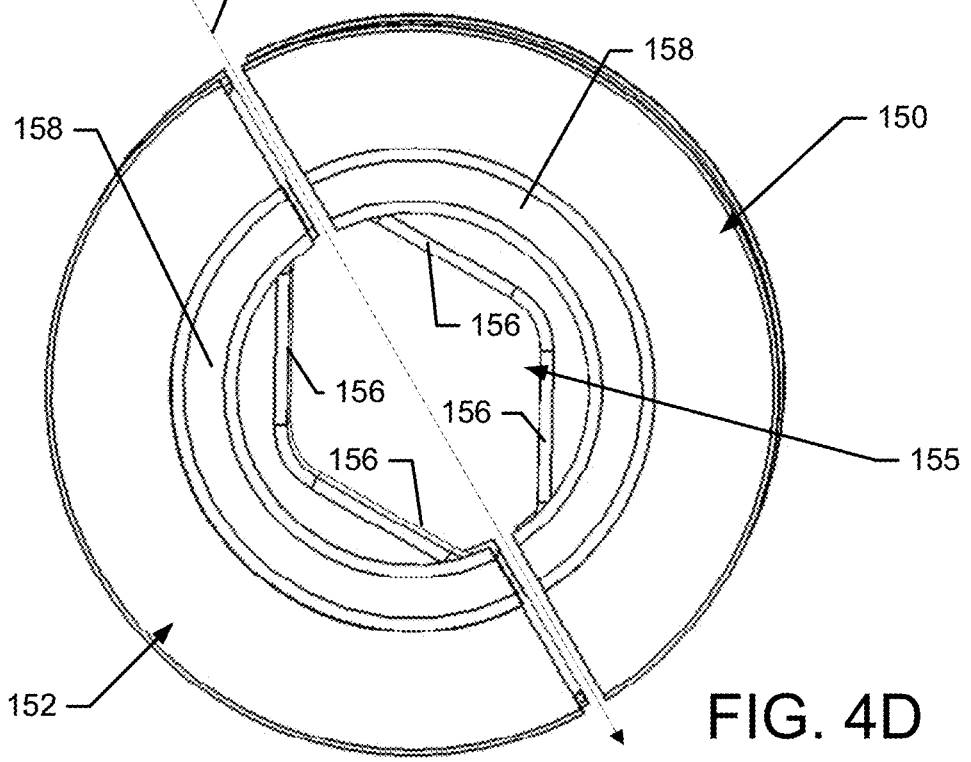
FIG. 4D is a side view of a wedge channel formed between the first radial member and the second radial member according to an example embodiment.
Figure 9A:
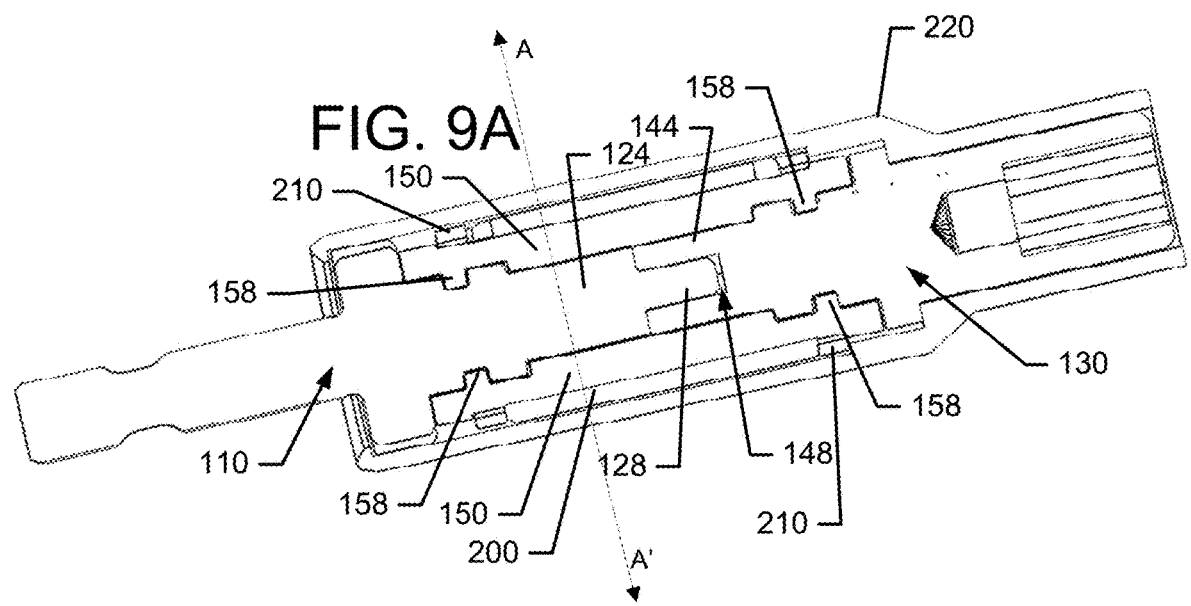
Figure 9B:
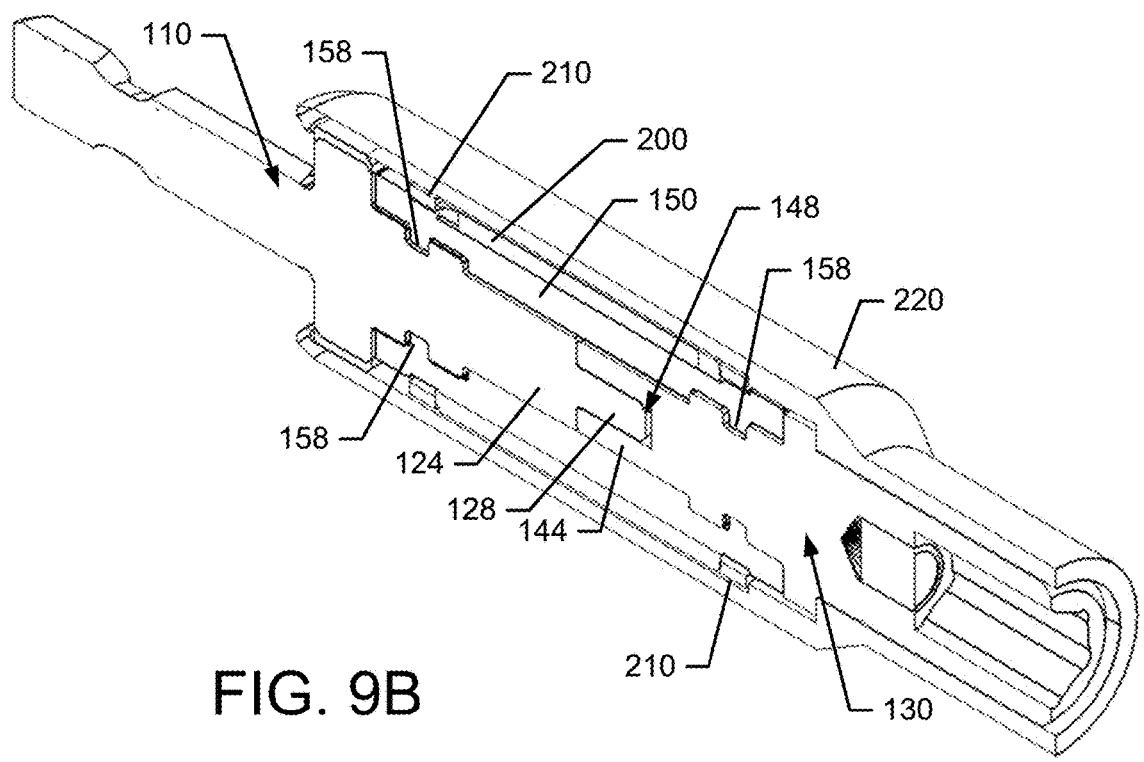
Figure 9C:
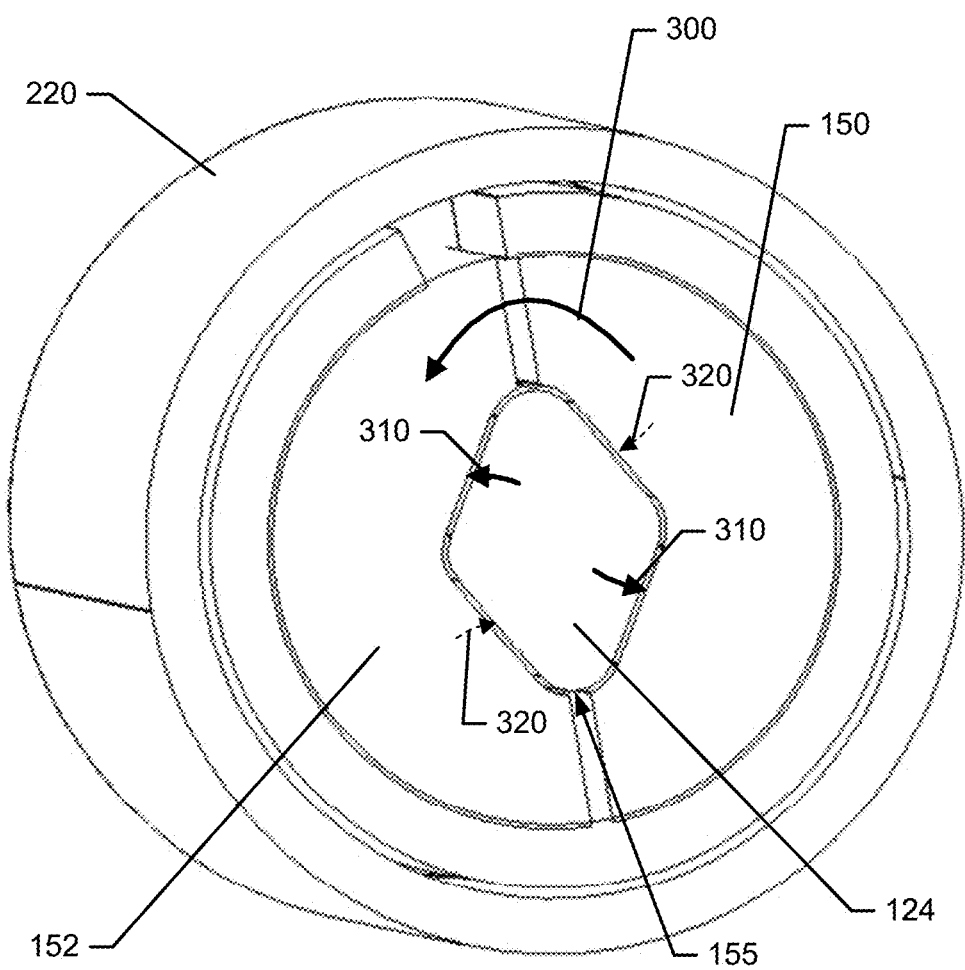
Figure 10:
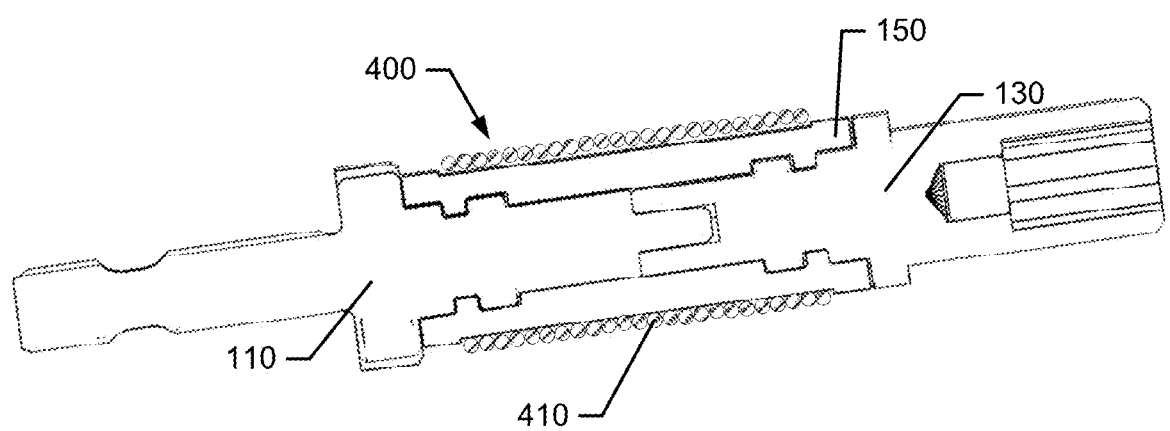

FIG. 9A and FIG. 9B each illustrates different perspective cross section views through the divider plane of FIG. 4D;

FIG. 9C is a cross section view of the bit holder taken along line A-A' in FIG. 9A according to an example embodiment; and FIG. 10 illustrates a cross section view of the bit holder with an alternative elastic member according to an example embodiment.

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

As indicated above, some example embodiments may relate to the provision of driving tool such as a bit holder that can be used with impact drivers. In an example embodiment, the driving tool (which will be described as a bit holder to illustrate one example) may be constructed in such a way as to prevent the bit holder from absorbing and dissipating all of the torque load applied thereto within the metal shaft or core of such device. Instead, a structure is employed that strategically distributes forces within the device without reducing the overall impact energy that can be delivered through the device. For example, the bit holder described herein may include a drive end and a driven end that are made separately, and that do not couple torque therebetween directly. Instead, the drive end and the driven end are operably coupled to each other via an elastic torque transfer assembly. Some structures that can employ example embodiments will now be described below by way of example and not limitation.

Figure 1A:
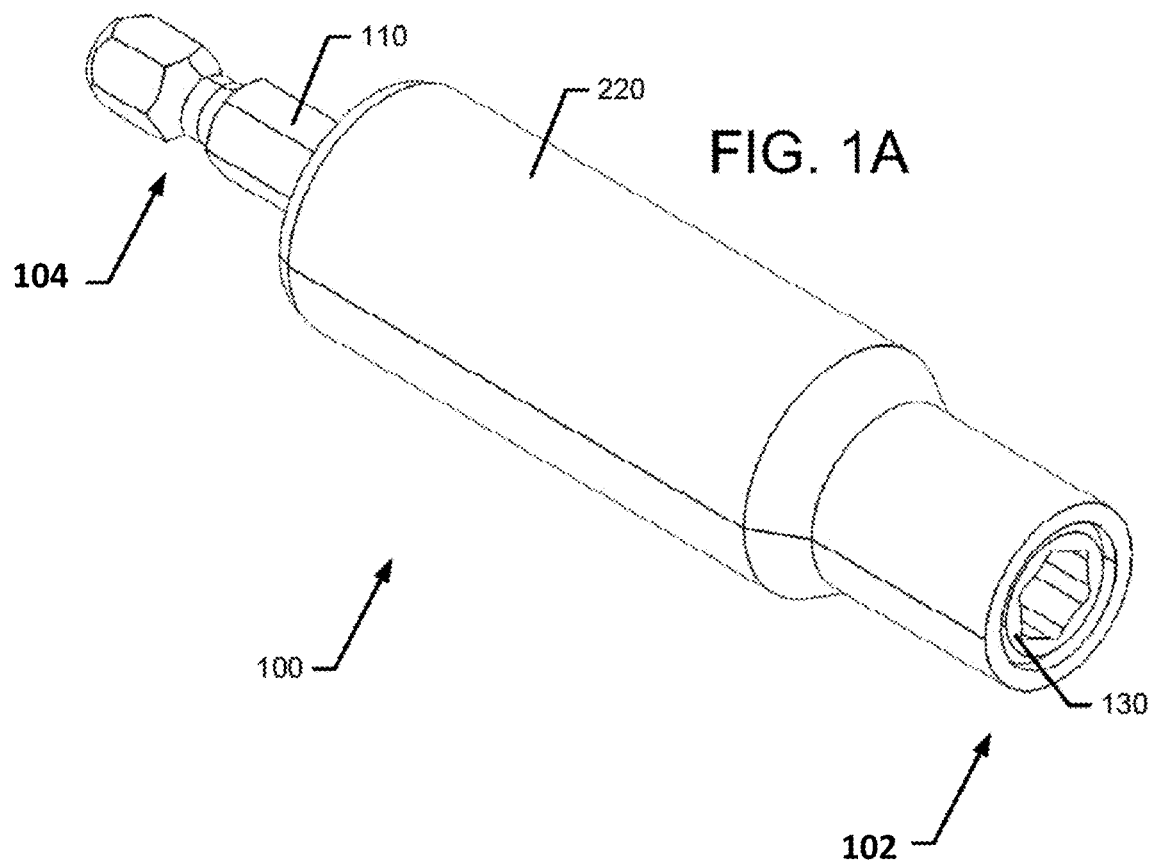
FIG. 1A illustrates a perspective view of a driven end of a bit holder according to an example embodiment.
Figure 1B:
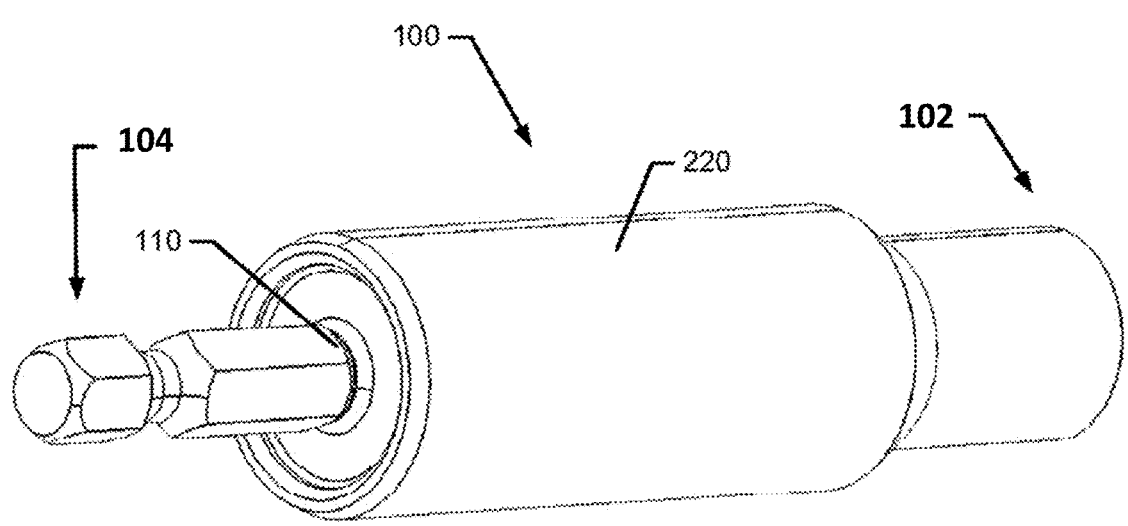
FIG. 1B is a perspective view of a drive end of the bit holder according to an example embodiment.
Figure 2:
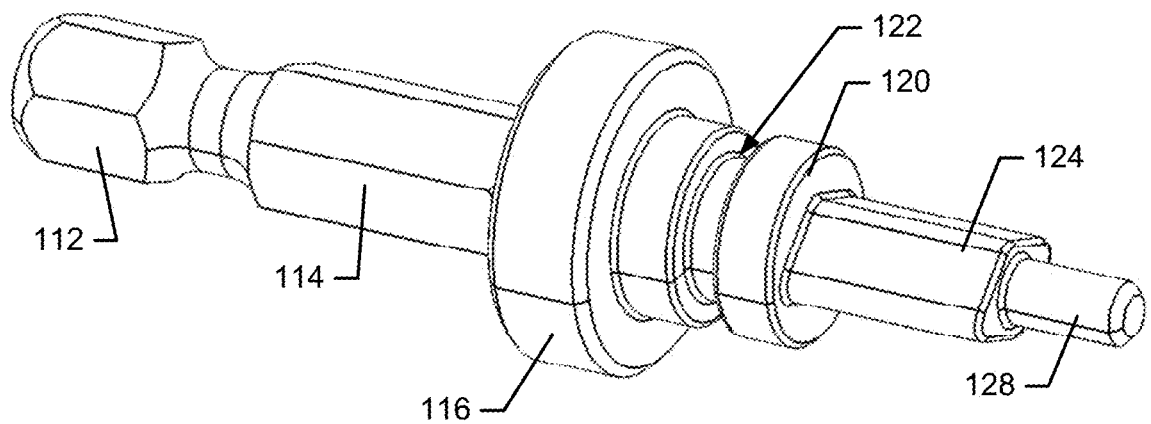
FIG. 2 is a perspective view of a drive body in isolation according to an example embodiment.

FIG. 1A illustrates a perspective view of a bit holder 100 according to an example embodiment, showing a driven end 102 thereof. FIG. 1B is a perspective view of the bit holder 100 showing the drive end 104 thereof. As noted above, the drive end 104 is configured to interface with a powered driving device and the driven end 102 is configured to interface with a bit. The drive end 104 may include a drive body 110 shown in isolation in FIG. 2. The drive body 110 may include a hex head 112 and shaft 114 that are coaxial with each other and a base plate 116. The base plate 116 may be a cylindrical body that defines a transition to a torque transfer portion of the drive body 110.

The torque transfer portion of the drive body 110 may include an axial retainer 120, which may be adjacent to the base plate 116, and is also coaxial with the base plate 116, the hex head 112 and the shaft 114. The axial retainer 120 of this example embodiment is also defined by a cylindrical body. However, the cylindrical body includes an annular groove 122 that extends around the circumference of the axial retainer 120 and extends radially inwardly from the circumference of the axial retainer 120. In this example, the annular groove 122 is disposed at about a longitudinal midpoint of the axial retainer 120 so that substantial amounts of material of the axial retainer 120 are disposed on both sides of the annular groove 112. The torque transfer portion of the drive body 110 may also include a wedge 124 or cam body. The wedge 124 may be configured to interface with a driven body 130 of the driven end 102 and a torque transfer assembly of an example embodiment as described in greater detail below.

Figure 3:
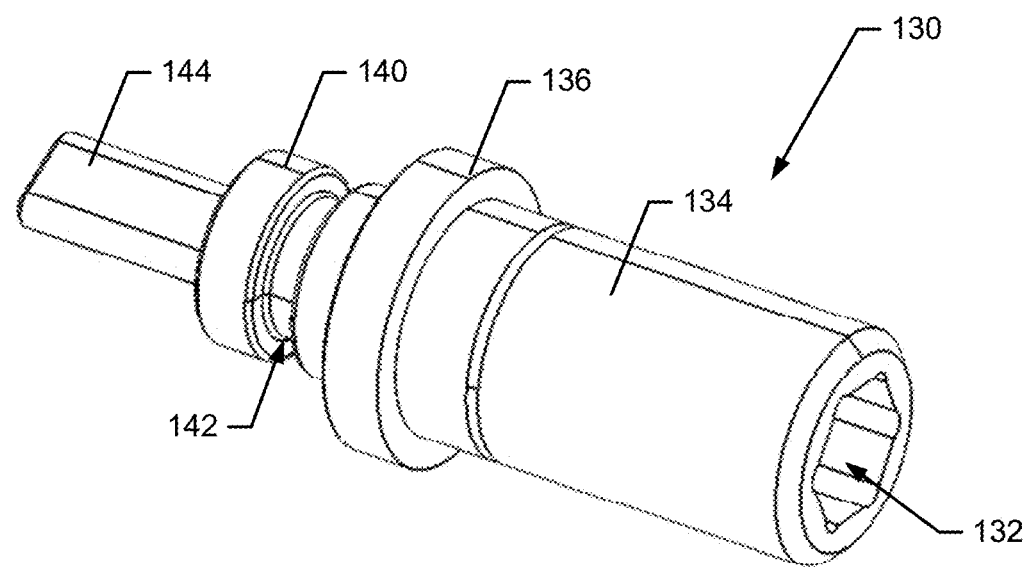
FIG. 3 is a perspective view of a driven body in isolation according to an example embodiment.

The driven end 102 may include the driven body 130, as noted above. The drive end 102 may be configured to interface with the bit in order to drive the bit responsive to the application of torque by the powered driving device to the drive end 104. The driven body 130 is shown in isolation in FIG. 3. In this regard, the driven body 130 may include a hex socket 132 and socket body 134 that are coaxial with each other and a base plate 136. The base plate 136 may be a cylindrical body that defines a transition to a torque transfer portion of the driven body 130.

The torque transfer portion of the driven body 130 may include an axial retainer 140, which may be adjacent to the base plate 136, and may also be coaxial with the base plate 136, the hex socket 132 and the socket body 134. The axial retainer 140 of this example embodiment is also defined by a cylindrical body, and may mirror the axial retainer 120 of the drive body 110. As such, the cylindrical body of the axial retainer 140 includes an annular groove 142 that extends around the circumference of the axial retainer 140 and extends radially inwardly from the circumference of the axial retainer 140. In this example, the annular groove 142 is disposed at about a longitudinal midpoint of the axial retainer 140 so that substantial amounts of material of the axial retainer 140 are disposed on both sides of the annular groove 142. The torque transfer portion of the driven body 130 may also include a wedge 144 or cam body. The wedge 144 may be configured to interface with the wedge 124 of the drive body 110 of the drive end 104 and the torque transfer assembly of an example embodiment as described in greater detail below.

The interface between the wedges 124 and 144 of the drive body 110 and driven body 130, respectively, may be defined in a number of ways. In this example, the interface may be configured to maintain axial alignment of the drive body 110 and the driven body 130. As such, the wedge 124 may have a projection 128 extending therefrom coaxial with the longitudinal centerline of the drive body 110 from a distal end of the wedge 124 (relative to the base plate 116). The wedge 144 may have a recess 148 formed therein and coaxial with the longitudinal centerline of the driven body 130 and at a distal end of the wedge 144 (relative to the base plate 136). The recess 148 of the wedge 144 may receive the projection 128 of the wedge 124 to hold the drive body 110 coaxial with the driven body 130, while still permitting rotation of each of the drive body 110 and the driven body 130 relative to each other.

The rotation of the drive body 110 may be communicated to the driven body 130 by the torque transfer assembly. The torque transfer assembly may be formed in a number of ways, and with various different structures. In one example embodiment, the torque transfer assembly may include dual functions of holding the drive body 110 and the driven body 130 in proximity to each other axially (e.g., preventing separation of the projection 128 from the recess 148) and of transferring (or communicating) torque from the drive body 110 to the driven body 130. To accomplish these dual functions, the torque transfer assembly may include, for example, a pair of radial members (e.g., first radial member 150 and second radial member 152) that act as torque transfer elements) along with an elastic member (or members).

FIG. 4, which is defined by FIGS. 4A, 4B, 4C and 4D, illustrates the first radial member 150 in isolation (in FIG. 4A), the second radial member 152 in isolation (in FIG. 4B), and the first and second radial members 150 and 152 situated proximate to each other in their normal configuration (in FIGS. 4C and 4D). The first and second radial members 150 and 152 may mirror each other about a dividing plane 154 shown in FIG. 4D. The dividing plane 154 may pass along a longitudinal centerline of the drive body 110 and the driven body 130, but also divide the first and second radial members 150 and 152 from each other. Thus, when positioned in their normal configuration, the first and second radial members 150 and 152 may form a substantially cylindrical structure, which may extend around the wedges 124 and 144 of the drive body 110 and the driven body 130.

As shown best in FIG. 4D, a wedge channel 155 may be provided in a gap formed between the first and second radial members 150 and 152. The wedge channel 155 may be formed to have a size slightly larger than a size of the wedges 124 and 144, but may otherwise have a shape generally matching a shape of the lateral sides of the wedges 124 and 144. The wedge channel 155 may be formed by cam surfaces 156 that face the lateral sides of the wedges 124 and 144 when the wedges 124 and 144 are inserted into the wedge channel 155. The longitudinal length of the wedge channel 155 may be substantially equal to a combined length of the wedges 124 and 144, so that they are coextensive along their entire lengths. Thus, the cam surfaces 156 may also be substantially equal in length to a combined length of the wedges 124 and 144, so that the cam surfaces 156 are coextensive with a combination of the lengths of the lateral sides of the wedges 124 and 144.

As can be seen in FIGS. 4A and 4B, and appreciated from the descriptions above, when the first and second radial members 150 and 152 are disposed proximate to each other to form the wedge channel 155 and surround the lateral sides of the wedges 124 and 144, the cam surfaces 156 may terminate at the axial retainers 120 and 140 of the drive body 110 and driven body 130, respectively. Moreover, the first and second radial members 150 and 152 may each include respective instances of a annular projection 158 that is configured to be inserted into the annular grooves 122 and 142 of the drive body 110 and driven body 130, respectively. By being inserted into the annular grooves 122 and 142, the annular projections 158 may hold the drive body 110 and driven body 130 in axial proximity to each other (i.e., such that the wedges 124 and 144 contact each other at respective distal ends thereof (relative to the base plates 116 and 136, respectively)). However, it should be appreciated that the torque transfer assembly may further include one or more components that function to keep the first and second radial members 150 and 152 positioned proximate to each other in a proper orientation, and further enable the first and second members 150 and 152 to perform the dual functions described above (i.e., holding the drive body 110 and driven body 130 in their axial arrangement). One example of components that may perform this function is shown in FIGS. 5-8.

In this regard, FIG. 5 illustrates a perspective view of a split dowel 200 that may be used as an example of an elastic member that may be used to hold the first and second radial members 150 and 152 positioned proximate to each other in the proper orientation, and also resist movement of the first and second radial members 150 and 152 away from each other when a force exerted on any of the cam surfaces 156 is experienced (e.g., due to rotational force being exerted on the drive body 110 and therefore the wedge 124). The split dowel 200 is constructed to resist any radial outward forces that would tend to displace the split dowel 200 from the rest position shown in FIG. 5. As such, when the split dowel 200 extends around the first and second radial members 150 and 152, as shown in FIG. 6, any displacement (i.e., radially outward) of the first and second radial members 150 and 152 from their rest position will also be resisted. As such, the split dowel 200 acts as an elastic member to elastically resist movement of either of the first and second radial members 150 and 152.

In an example embodiment, one or more limiter bands 210 may also be provided to resist movement of either of the first and second radial members 150 and 152. The limiter bands 210 may be positioned at respective longitudinal ends of the split dowel 200 as shown in FIG. 6. The limiter bands 210 may be annular or ring shaped members that extend continuously around the outer periphery of the first and second radial members 150 and 152. The limiter bands 210 may hold the split dowel 200 in place, but also assist in retaining the first and second radial members 150 and 152 proximate to each other about the wedges 124 and 144.

Figure 7A:
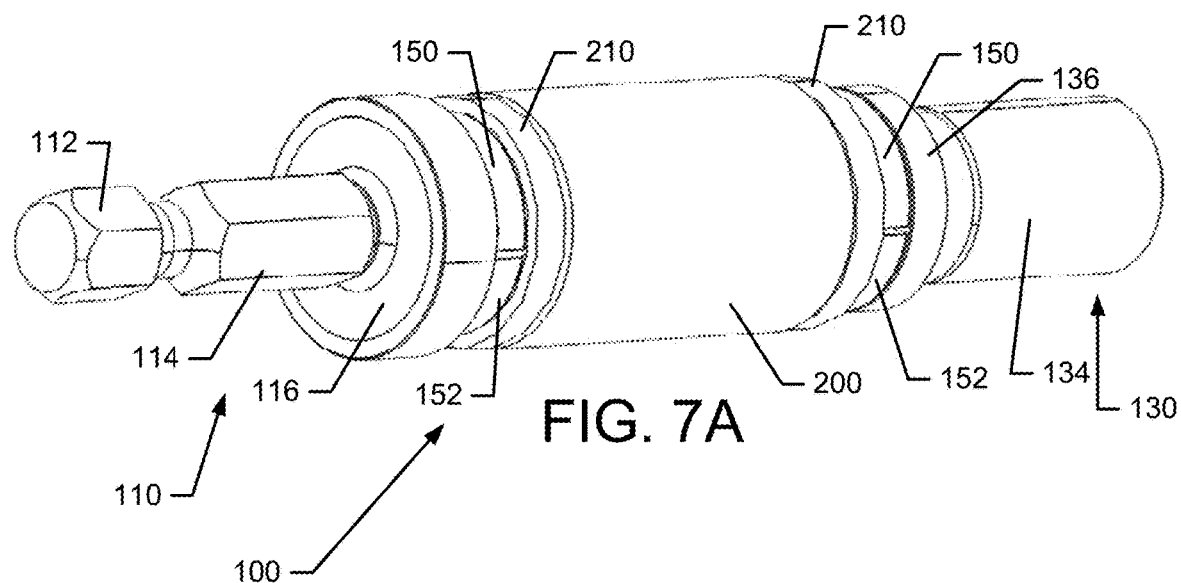
FIG. 7A illustrates a perspective view of the drive end of the bit holder with outer shell removed according to an example embodiment.
Figure 7B:
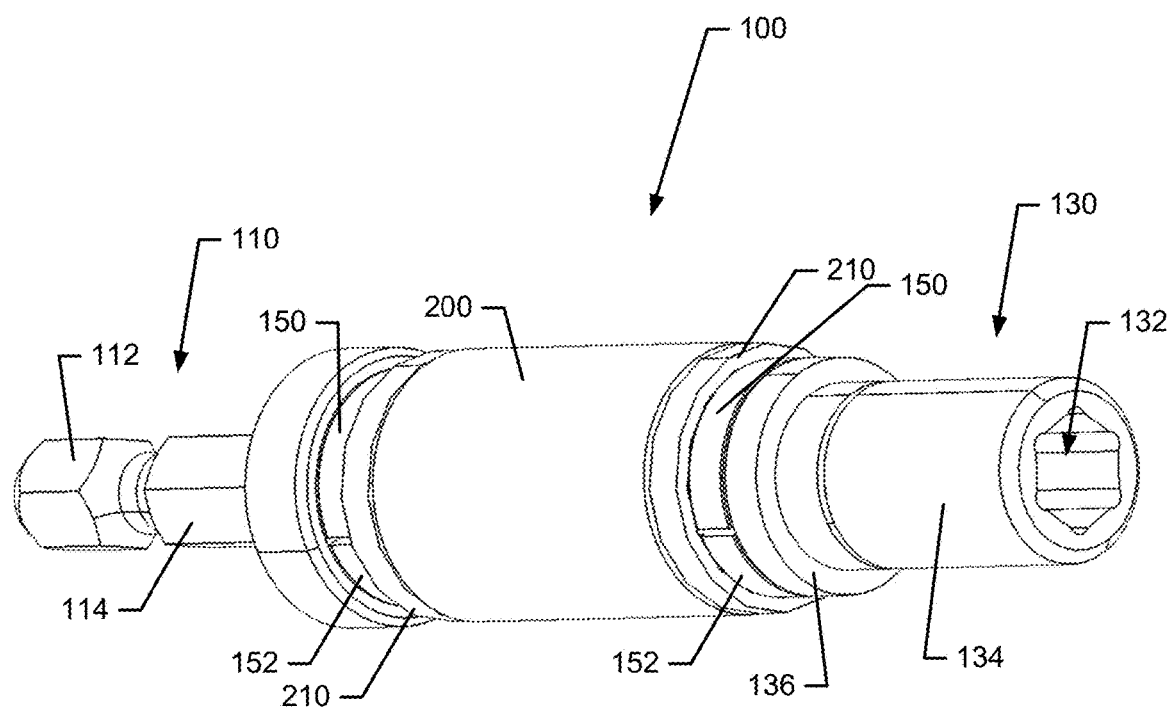
FIG. 7B is a perspective view of a driven end of the bit holder with outer shell removed according to an example embodiment.
Figure 8C:
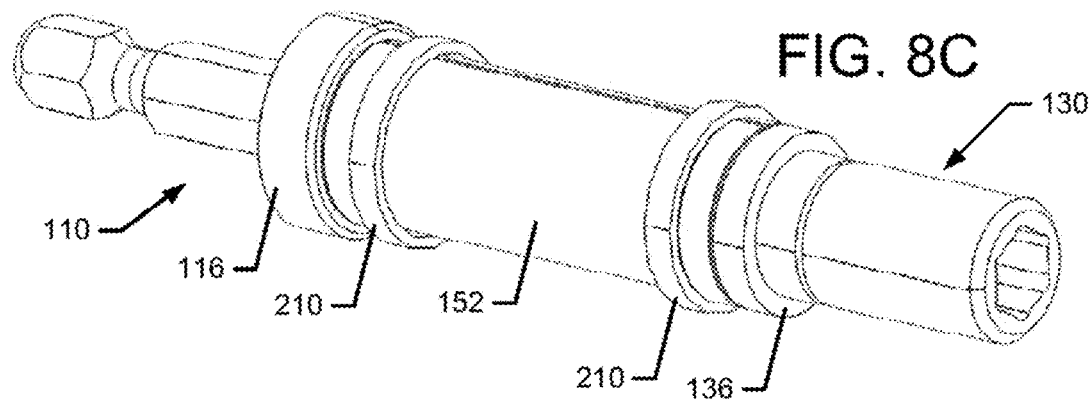
FIG. 8C is a perspective view of the drive body and driven body of FIG. 8B after the second radial member and limiter bands are attached according to an example embodiment.
Figure 8B:
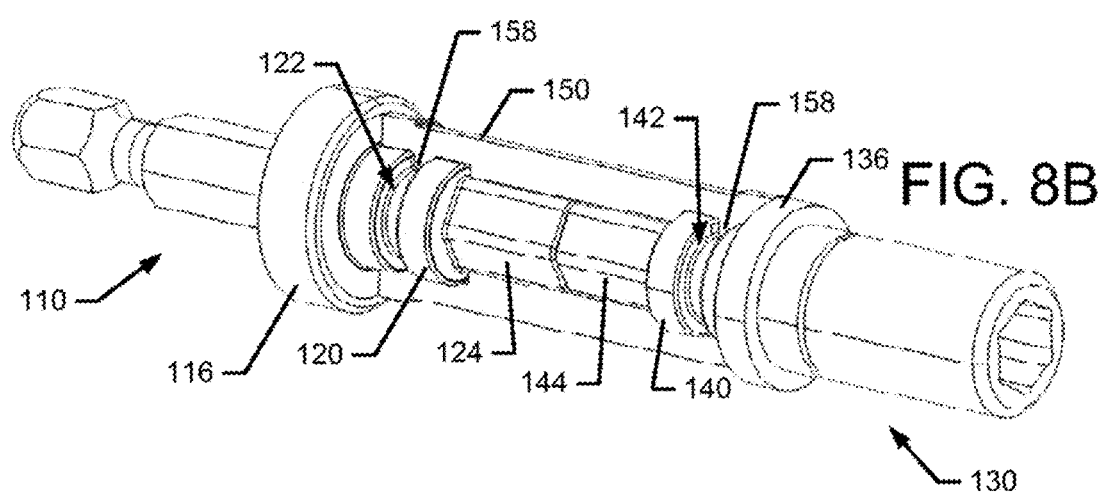
FIG. 8B is a perspective view of the drive body and driven body of FIG. 8A after the first radial member is positioned proximate thereto according to an example embodiment.
Figure 8A:
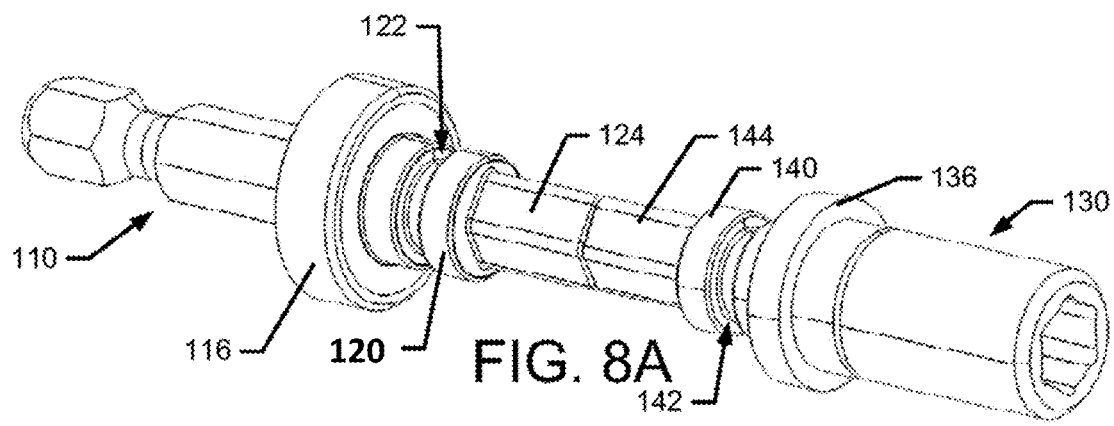
FIG. 8A is a perspective view of the drive body and driven body in isolation according to an example embodiment.

FIG. 7, which is defined by FIGS. 7A and 7B, shows different perspective views of a fully assembled instance of the bit holder 100 of FIG. 1 except that a shell 220 of the bit holder 100 that is shown in FIG. 1 has been removed in FIGS. 7A and 7B. FIG. 8, which is defined by FIGS. 8A, 8B and 8C shows an order of assembly of various components of the bit holder 100 prior to reaching the state of assembly shown in FIG. 7. In this regard, FIG. 8A shows the drive body 110 and the driven body 130 engaged with each other (e.g., via insertion of the projection 128 into the recess 148 (see FIG. 9)), and with the lateral sides of the wedges 124 and 144 aligned with each other. As shown in FIG. 8B, the first radial member 150 may be placed proximate to the wedges 124 and 144 such that the lateral sides of the wedges 124 and 144 are proximate to the cam surfaces 156 of the first radial member 150. The annular projections 158 of the first radial member 150 are also inserted into the annular grooves 122 and 142 of the axial retainers 120 and 140 of the drive body 110 and driven body 130, respectively. Thereafter, as shown in FIG. 8C, the second radial member 152 may be placed proximate to the first radial member 150, between the base plates 116 and 136, to form the wedge channel 155 inside which the wedges 124 and 144 are disposed. The limiter bands 210 may then be placed around the outer periphery of the first and second radial members 150 and 152. And the split dowel 200 may also be placed around the outer periphery of the first and second radial members 150 and 152 as further shown in FIG. 7. Thereafter, the outer shell 220 of FIG. 1 may be applied.

FIG. 9, which is defined by FIGS. 9A, 9B, and 9C, shows cross section views that facilitate further explanation of how one example embodiment of the bit holder 100 may be constructed (e.g., in reference to FIGS. 9A and 9B) and operate (e.g., in reference to FIGS. 9A, 9B, and 9C). The cross section of FIGS. 9A and 9B may be taken along the dividing plane 154 shown in FIG. 4D. Referring to FIGS. 9A and 9B (and as shown and described above), the projection 128 of the wedge 124 may be inserted into the recess 148 of the wedge 144. The wedges 124 and 128 may be aligned with each other so that the lateral sides of the wedges 124 and 144 are substantially coplanar. As noted above, the annular projections 158 of the first and second radial members 150 and 152 are also inserted into the annular grooves 122 and 142 of the axial retainers 120 and 140 of the drive body 110 and driven body 130, respectively. This maintains the drive body 110 and driven body 130 in relation to each other axially so that the drive body 110 cannot separate from the driven body 130 axially.

With the first and second radial members 150 and 152 placed around the wedges 124 and 144 such that the lateral sides of the wedges 124 and 144 are proximate to the cam surfaces 156 of the first and second radial members 150 and 152 (within the wedge channel 155), there may be a relatively small space within the wedge channel 155 to permit a small amount of movement of one of the wedges 124 or 144 without movement of the other wedge 124 or 144. This small space is visible in FIG. 9C. However, with any rotary movement of the wedge 124 (e.g., shown by arrow 300 in FIG. 9C), the wedge 124 will impart a force on the cam surface 156 of the first and second radial members 150 and 152 facing leading edges of the wedge 124. Although the wedge 144 is not obliged to move responsive to movement of the wedge 124 through any direct connection therebetween, the force exerted by the wedge 124 on the cam surface 156 of the first and second radial members 150 and 152 may cause a slight deformation (e.g., radial outward movement) of the first and second radial members 150 and 152. This radial outward movement will be resisted by the elastic element (i.e., the split dowel 200). In response to this resistance, instead of further deformation, the first and second radial members 150 and 152 will be carried along with the rotation of the wedge 124. Through contact between the same cam surfaces 156, and the other lateral sides of the wedge 144, the wedge 144 will also be carried along with the rotation of the first and second radial members 150 and 152. Referring to the cross section of FIG. 9C, when the wedge 124 rotates as shown by arrow 300, a force is imparted on the cam surfaces 156 of the first and second radial members 150 and 152 in directions and at locations shown by arrows 310. Meanwhile, the movement of the first and second radial members 150 and 152 impart forces on the other wedge 144 through the other cam surfaces 156 in directions and at locations shown by arrows 320.

By including the small amount of play in the wedge channel 155, and by the elasticity provided by the elastic member (i.e., the split dowel 200), although the same torque is ultimately passed from the drive body 110 to the driven body 130, the forces are distributed through the structures of the bit holder 100 in a less concentrated way, thereby improving the durability and lessening the chances of component failure for the bit holder 100 over time.

In an example embodiment, the drive body 110 and the driven body 130 may be made of the same type of metallic material (e.g., steel or various alloys thereof). Meanwhile, the outer shell 220 may be made of a scratch resistant or decorative material (e.g., plastics, nylon, or other moldable materials). However, the outer shell 220 of some embodiments could also be designed to be load bearing. The components of the torque transfer assembly (e.g., the first and second radial members 150 and 152, the split dowel 200 and the limiter bands 210) may be made of the same or different materials, and may be made of metallic materials (e.g., steel or various allows thereof). However, the use of non-metallic components is also possible.

It should also be appreciated that the torque transfer assembly could take different forms. For example, as shown in FIG. 10, the same structures could be used for many of the parts of the bit holder 100 described above. However, the elastic member 400 could be provided as a series of rings 410 that extend around the first and second radial members 150 and 152 (thereby replacing the split dowel 200 and the limiter bands 210).

As noted above, the torque transfer assembly may include dual functions of holding the drive body 110 and the driven body 130 in proximity to each other axially and of transferring (or communicating) torque from the drive body 110 to the driven body 130. These two functions may be performed by respective different subassemblies including an axial movement limiting subassembly, which holds the drive body 110 and driven body 130 in proximity to each other axially, and a rotation limiting subassembly with limits the amount of relative rotation that is possible between the drive body 110 and the driven body 130 in order to transfer torque from the drive body 110 to the driven body 130. Notably, however, the rotation limiting subassembly and the axial movement limiting subassembly may share some components (i.e., some components may perform or cooperate with other components to perform functions of each respective subassembly).

Accordingly, driving device (e.g., a bit holder) of an example embodiment, or a torque transfer assembly included in such a driving device, may be provided. The torque transfer assembly may include an axial movement limiting subassembly and a rotation limiting subassembly. The axial movement limiting subassembly is configured to retain a drive body of the bit holder in proximity to a driven body of the bit holder. The rotation limiting subassembly is configured to cause torque applied to the drive body to be transferred to the driven body. The rotation limiting subassembly includes a first cam body at a distal end of the drive body and a second cam body at a distal end of the driven body. The first and second cam bodies are configured to transfer a majority of the torque between the drive body and the driven body indirectly via the torque transfer assembly by limiting rotation of the first cam body relative to the second cam body. The majority of the torque may, for example, represent between about 80% to 100% of the torque such that between about 0% and 20% could be transferred directly between the drive body and the driven body. Thus, in some cases, the first and second cam bodies may be configured to only transfer torque between the drive body and the driven body indirectly via the torque transfer assembly by limiting rotation of the first cam body relative to the second cam body, but in other cases, small amounts of direct transfer between male and female portions at respective ends of the drive body and driven body could occur. For example, a small portion of the torque, in this example between 0% and 20%, may be transferred between the drive body and the driven body via the shell 220, which may elastically deform during operation and also may have a first end and a second end coupled to the drive body and driven body, respectively.

In some embodiments, the coupler may include additional, optional features, and/or the features described above may be modified or augmented. Some examples of modifications, optional features and augmentations are described below. It should be appreciated that the modifications, optional features and augmentations may each be added alone, or they may be added cumulatively in any desirable combination. In an example embodiment, the torque transfer assembly may include a first radial member and a second radial member. The first and second radial members may combine to form a substantially cylindrical shape and define a wedge channel therebetween. The first and second radial members may form part of the rotation limiting subassembly and define cam surfaces proximate to the wedge channel. The cam surfaces may interface with the first and second cam bodies to transfer torque from the first cam body to the second cam body via the cam surfaces. In an example embodiment, the rotation limiting subassembly may include an elastic member disposed to retain the first and second radial members proximate to each other and resist radial outward movement of the first and second radial members responsive to rotation of the first cam body or the second cam body. In some cases, the elastic member may include a split dowel disposed to extend around an outer periphery of the first and second radial members. In an example embodiment, the elastic member may further include a pair of limiter bands disposed at opposing longitudinal ends of the split dowel. In some cases, the elastic member may include a plurality of rings disposed to extend around an outer periphery of the first and second radial members. In an example embodiment, the drive body may include a first axial retainer disposed at a proximal end of the first cam body, and the driven body may include a second axial retainer disposed at a proximal end of the second cam body. The first and second axial retainers may each be part of the axial movement limiting subassembly. The first and second axial retainers may interface with the first and second radial members to prevent axial movement of the drive body and driven body relative to each other. In some cases, the first and second radial members may each include an annular projection configured to be inserted into an annular groove disposed at each of the first and second axial retainers of each of the drive body and the driven body, respectively. In an example embodiment, the first and second cam bodies may include first and second wedges, respectively. In some cases, the first wedge may include a projection at the distal end of the drive body, and the second wedge may include a recess disposed at the distal end of the driven body. The projection may be received in the recess to axially align the drive body and the driven body and enable rotation of the drive body relative to the driven body (albeit limited by the rotation limiting subassembly). In some cases, the elastic member may include a shell disposed to extend around an outer periphery of the first and second radial members. In such an example, the shell may be configured to engage the drive member and the driven member to prevent axial movement of the drive body and driven body relative to each other.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. An impact bit holder comprising:
   a drive body having a drive end configured to interface with a powered driver, the drive body comprising a first cam body at a distal end thereof relative to the drive end;
   a driven body having a driven end configured to interface with a bit, the driven body comprising a second cam body at a distal end thereof relative to the driven end, the drive body and the first cam body being configured to rotate relative to the driven body and the second cam body; and
   a torque transfer assembly disposed proximate to the first and second cam bodies and configured to transfer a majority of a torque between the drive body and the driven body, the torque transfer assembly comprising a first radial member, a second radial member, and an elastic member;
   wherein the first and second radial members combine to enclose the first cam body and the second cam body within a wedge channel formed between the first and second radial members;
   wherein the first and second radial members define cam surfaces proximate to the wedge channel;
   wherein, in response to the torque, the first cam body or the second cam body interfaces with the cam surfaces of the first and second radial members to cause a relative movement between the first and second radial members against a resistance of the elastic member to absorb at least some of the torque.

2. The impact bit holder of claim 1, wherein the elastic member is disposed to retain the first and second radial members proximate to each other and resist radial outward movement of the first and second radial members responsive to rotation of the first cam body or the second cam body.

3. The impact bit holder of claim 2, wherein the elastic member comprises a split dowel disposed to extend around an outer periphery of the first and second radial members.

4. The impact bit holder of claim 3, wherein the elastic member further comprises a pair of limiter bands disposed at opposing longitudinal ends of the split dowel.

5. The impact bit holder of claim 2, wherein the elastic member comprises a plurality of rings disposed to extend around an outer periphery of the first and second radial members.

6. The impact bit holder of claim 2, wherein the elastic member comprises a shell disposed to extend around an outer periphery of the first and second radial members.

7. The impact bit holder of claim 6, wherein the shell is configured to engage the drive member and the driven member to prevent axial movement of the drive body and driven body relative to each other.

8. The impact bit holder of claim 1, wherein the drive body comprises a first axial retainer disposed at a proximal end of the first cam body relative to the drive end, and the driven body comprises a second axial retainer disposed at a proximal end of the second cam body relative to the driven end, and
wherein the first and second axial retainers interface with the first and second radial members to prevent axial movement of the drive body and driven body relative to each other.

9. The impact bit holder of claim 8, wherein the first and second radial members each include an annular projection configured to be inserted into an annular groove disposed at each of the first and second axial retainers of each of the drive body and the driven body, respectively.

10. The impact bit holder of claim 1, wherein the first and second cam bodies comprise first and second wedges, respectively.

11. The impact bit holder of claim 10, wherein the first wedge comprises a projection at the distal end of the drive body relative to the drive end,
wherein the second wedge comprises a recess disposed at the distal end of the driven body relative to the driven end, and
wherein the projection is received in the recess to axially align the drive body and the driven body and enable rotation of the drive body relative to the driven body.

12. The impact bit holder of claim 1, wherein the majority of the torque comprises about 80% to about 100% of the torque.

13. A torque transfer assembly for a bit holder, the torque transfer assembly comprising:
an axial movement limiting subassembly configured to retain a drive body of the bit holder in proximity to a driven body of the bit holder; and
a rotation limiting subassembly configured to cause a majority of torque applied to the drive body to be transferred to the driven body,
wherein the rotation limiting subassembly comprises a first cam body at a distal end of the drive body relative to the drive end, and a second cam body at a distal end of the driven body relative to the driven end,
wherein the first and second cam bodies are configured to only transfer the majority of the torque between the drive body and the driven body by limiting rotation of the first cam body relative to the second cam body,
wherein the rotation limiting subassembly further comprises a radial member and an elastic member,
wherein the radial member defines a cam surface proximate to the radial member,
wherein, in response to the torque, the first cam body or the second cam body interfaces with the cam surface of the radial member to cause radial movement of the radial member against a bias of the elastic member to absorb at least some of the torque.

14. The torque transfer assembly of claim 13, wherein the radial member is a first radial member;
wherein the torque transfer assembly comprises the first radial member and a second radial member,
wherein the first and second radial members combine to form a substantially cylindrical shape and define a wedge channel therebetween, and
wherein the first and second radial members form part of the rotation limiting subassembly and define cam surfaces proximate to the wedge channel, the cam surfaces interfacing with the first and second cam bodies to transfer torque from the first cam body to the second cam body via the cam surfaces.

15. The torque transfer assembly of claim 14, wherein the elastic member comprises a split dowel disposed to extend around an outer periphery of the first and second radial members, and the elastic member further comprises a pair of limiter bands disposed at opposing longitudinal ends of the split dowel, or
wherein the elastic member comprises a plurality of rings disposed to extend around an outer periphery of the first and second radial members, or
wherein the elastic member comprises a shell disposed to extend around an outer periphery of the first and second radial members, the shell being configured to engage the drive member and the driven member to prevent axial movement of the drive body and driven body relative to each other.

16. The torque transfer assembly of claim 14, wherein the drive body comprises a first axial retainer disposed at a proximal end of the first cam body relative to the drive end, and the driven body comprises a second axial retainer disposed at a proximal end of the second cam body relative to the driven end, the first and second axial retainers each being part of the axial movement limiting subassembly,
wherein the first and second axial retainers interface with the first and second radial members to prevent axial movement of the drive body and driven body relative to each other, wherein the first and second radial members each include an annular projection configured to be inserted into an annular groove disposed at each of the first and second axial retainers of each of the drive body and the driven body, respectively, and wherein the first and second cam bodies comprise first and second wedges, respectively.

17. The torque transfer assembly of claim 16, wherein the first wedge comprises a projection at the distal end of the drive body relative to the drive end,
wherein the second wedge comprises a recess disposed at the distal end of the driven body relative to the driven end, and
wherein the projection is received in the recess to axially align the drive body and the driven body and enable rotation of the drive body relative to the driven body.

18. The torque transfer assembly of claim 14, wherein the majority of the torque comprises about 80% to about 100% of the torque.

* * * * *